(12) United States Patent
Li et al.

(10) Patent No.: US 12,265,319 B2
(45) Date of Patent: Apr. 1, 2025

(54) LASER SOURCE ASSEMBLY AND LASER PROJECTION APPARATUS

(71) Applicant: Hisense Laser Display Co., Ltd, Qingdao (CN)

(72) Inventors: Wei Li, Qingdao (CN); Youliang Tian, Qingdao (CN); Tiantian Tang, Qingdao (CN)

(73) Assignee: Hisense Laser Display Co., Ltd, Qingdao (CN)

( * ) Notice: Subject to any disclaimer, the term of this patent is extended or adjusted under 35 U.S.C. 154(b) by 366 days.

(21) Appl. No.: 17/936,502

(22) Filed: Sep. 29, 2022

(65) Prior Publication Data

US 2023/0028602 A1 Jan. 26, 2023

Related U.S. Application Data

(63) Continuation of application No. PCT/CN2021/103532, filed on Jun. 30, 2021.

(30) Foreign Application Priority Data

Dec. 29, 2020 (CN) .......................... 202011597569.2

(51) Int. Cl.
*G03B 21/20* (2006.01)
*G02B 5/30* (2006.01)
(Continued)

(52) U.S. Cl.
CPC ....... *G03B 21/2033* (2013.01); *G02B 5/3025* (2013.01); *G02B 13/06* (2013.01);
(Continued)

(58) Field of Classification Search
CPC ............ G03B 21/2033; G03B 21/2013; G03B 21/2066; G03B 21/208; G02B 5/3025; G02B 27/102; G02B 27/30
(Continued)

(56) References Cited

U.S. PATENT DOCUMENTS 8,946,594 B2 2/2015 Holmgren et al.
9,285,096 B2 3/2016 Miura
(Continued)

FOREIGN PATENT DOCUMENTS

CN 101855902 A * 10/2010 ............. G02B 3/005
CN 103454845 A 12/2013
(Continued)

OTHER PUBLICATIONS

Translation of CN 101855902 (Year: 2024).*
(Continued)

*Primary Examiner* — Jerry L Brooks
(74) *Attorney, Agent, or Firm* — Schwegman Lundberg & Woessner, P.A.

(57) ABSTRACT

A laser source assembly is provided. The laser source assembly includes a plurality of lasers, a light combining assembly and a fly-eye lens. The fly-eye lens is disposed on a light exit side of the light combining assembly, and is configured to homogenize laser beams. The fly-eye lens includes a plurality of first microlenses located on a light incident surface thereof and a plurality of second microlenses located on a light exit surface thereof. A sine value of a divergence angle of a laser beam in a fast axis direction is greater than a sine value of an aperture angle of a first microlens in a slow axis direction, and a sine value of a divergence angle of the laser beam in the slow axis direction is greater than a sine value of an aperture angle of the first microlens in the fast axis direction.

17 Claims, 10 Drawing Sheets

(51) Int. Cl.
 *G02B 13/06* (2006.01)
 *G02B 27/10* (2006.01)
 *G02B 27/30* (2006.01)

(52) U.S. Cl.
 CPC .......... *G02B 27/102* (2013.01); *G02B 27/30* (2013.01); *G03B 21/2013* (2013.01); *G03B 21/2066* (2013.01); *G03B 21/208* (2013.01)

(58) Field of Classification Search
 USPC .......................................................... 353/31
 See application file for complete search history.

(56) References Cited

U.S. PATENT DOCUMENTS

| | | |
|---|---|---|
| 9,636,778 B2 | 5/2017 | Holmgren et al. |
| 2011/0037953 A1 | 2/2011 | Nizani et al. |
| 2012/0080411 A1 | 4/2012 | Mizuyama et al. |
| 2013/0112667 A1 | 5/2013 | Holmgren et al. |
| 2013/0321780 A1 | 12/2013 | Miura |
| 2015/0136755 A1 | 5/2015 | Holmgren et al. |

FOREIGN PATENT DOCUMENTS

| | | |
|---|---|---|
| CN | 103797564 A | 5/2014 |
| CN | 203732864 U | 7/2014 |
| CN | 103968270 A | 8/2014 |
| CN | 104865785 A | 8/2015 |
| CN | 105511087 A | 4/2016 |
| CN | 107861178 A | 3/2018 |
| CN | 107861253 A | 3/2018 |
| WO | WO-2022142218 A1 | 7/2022 |

OTHER PUBLICATIONS

"International Application No. PCT/CN2021/103532, International Search Report and Written Opinion mailed Sep. 28, 2021", (Sep. 28, 2021), 12 pgs.

* cited by examiner

LASER SOURCE ASSEMBLY AND LASER PROJECTION APPARATUS

CROSS-REFERENCE TO RELATED APPLICATIONS

This application is a Continuation Application of PCT/CN2021/103532 filed on Jun. 30, 2021, which claims priority to Chinese Patent Application No. 202011597569.2 filed on Dec. 29, 2020, which are incorporated herein by reference in their entirety.

TECHNICAL FIELD

The present disclosure relates to the technical field of laser display, and in particular, to a laser source assembly and a laser projection apparatus.

BACKGROUND

With people's continuous pursuit of colors of an image, laser projection with characteristics of large imaging screen, high spectral brightness and wide color gamut has been developed. Three-color semiconductor lasers, as laser sources, are beginning to be used in laser projection technology.

SUMMARY

In an aspect, a laser source assembly is provided. The laser source assembly includes a plurality of lasers, a light combining assembly and a fly-eye lens. The plurality of lasers are configured to emit laser beams. The light combining assembly is disposed on a light exit side of the plurality of lasers, and is configured to combine the laser beams. The fly-eye lens is disposed on a light exit side of the light combining assembly, and is configured to homogenize the laser beams. The fly-eye lens includes a plurality of first microlenses located on a light incident surface thereof and a plurality of second microlenses located on a light exit surface thereof, and the plurality of first microlenses correspond to the plurality of second microlenses. A sine value of a divergence angle of a laser beam in a fast axis direction is greater than a sine value of an aperture angle of a first microlens in a slow axis direction, and a sine value of a divergence angle of the laser beam in the slow axis direction is greater than a sine value of an aperture angle of the first microlens in the fast axis direction.

In another aspect, a laser projection apparatus is provided. The laser projection apparatus includes the laser source assembly as described in the above, an optical engine and a projection lens. The laser source assembly is configured to emit illumination beams. The optical engine is configured to modulate the illumination beams to obtain projection beams. The projection lens is configured to project the projection beams into an image.

BRIEF DESCRIPTION OF THE DRAWINGS

In order to describe technical solutions in the present disclosure more clearly, accompanying drawings to be used in some embodiments of the present disclosure will be introduced briefly below. Obviously, the accompanying drawings to be described below are merely accompanying drawings of some embodiments of the present disclosure, and a person of ordinary skill in the art may obtain other drawings according to these drawings. In addition, the accompanying drawings to be described below may be regarded as schematic diagrams, and are not limitations on actual sizes of products, actual processes of methods and actual timings of signals involved in the embodiments of the present disclosure.

DETAILED DESCRIPTION

Figure 1:
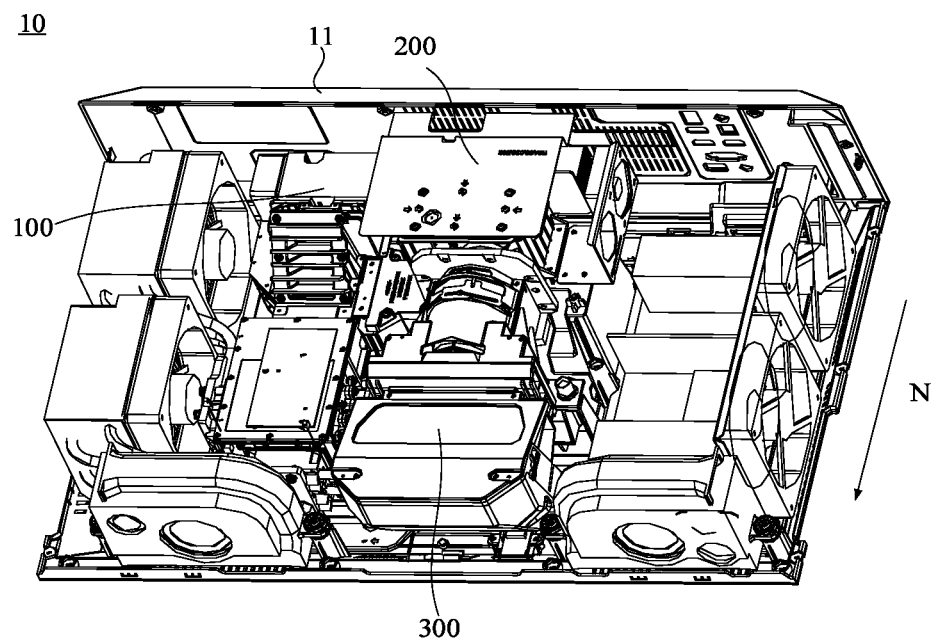
FIG. 1 is a structural diagram of a laser projection apparatus, in accordance with some embodiments.

Technical solutions in some embodiments of the present disclosure will be described clearly and completely below with reference to the accompanying drawings. Obviously, the described embodiments are merely some but not all embodiments of the present disclosure. All other embodiments obtained by a person of ordinary skill in the art on a basis of the embodiments of the present disclosure shall be included in the protection scope of the present disclosure.

Unless the context requires otherwise, throughout the description and the claims, the term "comprise" and other forms thereof such as the third-person singular form "comprises" and the present participle form "comprising" are construed in an open and inclusive sense, i.e., "including, but not limited to". In the description of the specification, terms such as "one embodiment", "some embodiments", "exemplary embodiments", "an example", "a specific example" or "some examples" are intended to indicate that specific features, structures, materials or characteristics related to the embodiment(s) or example(s) are included in at least one embodiment or example of the present disclosure. Schematic representations of the above terms do not necessarily refer to the same embodiment(s) or example(s). In addition, the specific features, structures, materials, or characteristics may be included in any one or more embodiments or examples in any suitable manner.

Hereinafter, the terms "first" and "second" are only used for descriptive purposes, and are not to be construed as indicating or implying the relative importance or implicitly indicating the number of indicated technical features. Thus, features defined by the terms "first" and "second" may explicitly or implicitly include one or more of the features. In the description of the embodiments of the present disclosure, the term "a plurality of" or "the plurality of" means two or more unless otherwise specified.

In the description of some embodiments, the term "connected" and derivatives thereof may be used. For example, the term "connected" may be used when describing some embodiments to indicate that two or more components are in direct physical or electrical contact with each other.

The phrase "at least one of A, B and C" has the same meaning as the phrase "at least one of A, B or C", and they both include the following combinations of A, B and C: only A, only B, only C, a combination of A and B, a combination of A and C, a combination of B and C, and a combination of A, B and C.

The phrase "A and/or B" includes the following three combinations: only A, only B, and a combination of A and B.

The use of "applicable to" or "configured to" herein indicates an open and inclusive expression, which does not exclude devices that are applicable to or configured to perform additional tasks or steps.

In addition, the use of the phrase "based on" means openness and inclusiveness, because processes, steps, calculations or other actions "based on" one or more of the stated conditions or values may be based on additional conditions or exceed the stated values in practice.

The term "about", "substantially" or "approximately" as used herein includes a stated value and an average value within an acceptable range of deviation of a particular value. The acceptable range of deviation is determined by a person of ordinary skill in the art in consideration of the measurement in question and errors associated with the measurement of a particular quantity (i.e., limitations of the measurement system).

Figure 13A:
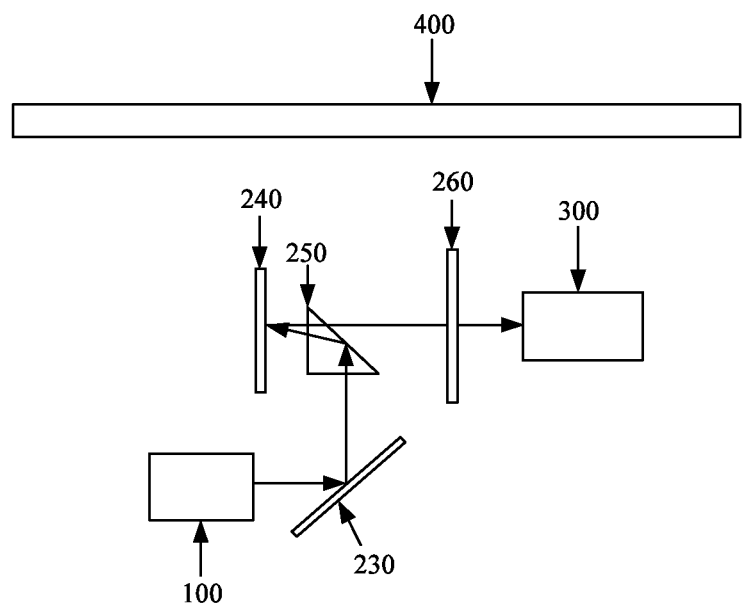
FIG. 13A is a structural diagram of another laser projection apparatus, in accordance with some embodiments.

Some embodiments of the present disclosure provide a laser projection apparatus. As shown in FIGS. 1 and 13A, the laser projection apparatus 10 includes a housing 11 (only a part of the housing 11 is shown in FIG. 1), a laser source assembly 100, an optical engine 200, and a projection lens 300 that are assembled in the housing 11, and a projection screen 400 located on a light exit path of the projection lens 300. The laser source assembly 100 is configured to provide illumination beams (laser beams). The optical engine 200 is configured to modulate the illumination beams provided by the laser source assembly 100 with image signals to obtain projection beams. The projection lens 300 is configured to project the projection beams into an image on the projection screen 400.

In some embodiments, one end of the optical engine 200 is connected to the laser source assembly 100, and another end thereof is connected to the projection lens 300. The laser source assembly 100 and the optical engine 200 are arranged in an exit direction of the illumination beams of the laser projection apparatus 10 (referring to the M direction shown in FIG. 2), the optical engine 200 and the projection lens 300 are arranged in an exit direction of the projection beams of the laser projection apparatus 10 (referring to the N direction shown in FIG. 2), and the M direction is substantially perpendicular to the N direction. Such connection structure may not only adapt to characteristics of a beam path of a reflective light valve in the optical engine 200, but may also reduce a length of a beam path in a single dimension and thus facilitate structural arrangement of the laser projection apparatus 10. The reflective light valve will be described hereinafter.

In some embodiments, the laser source assembly 100 may provide beams of three primary colors sequentially (beams of other colors may also be added on a basis of the beams of the three primary colors). Due to a phenomenon called persistence of vision, the human eyes will perceive a mixture of the beams of the three primary colors, that is, white beams. Alternatively, the laser source assembly 100 may simultaneously output beams of three primary colors, so as to continuously emit white beams.

Figure 2:
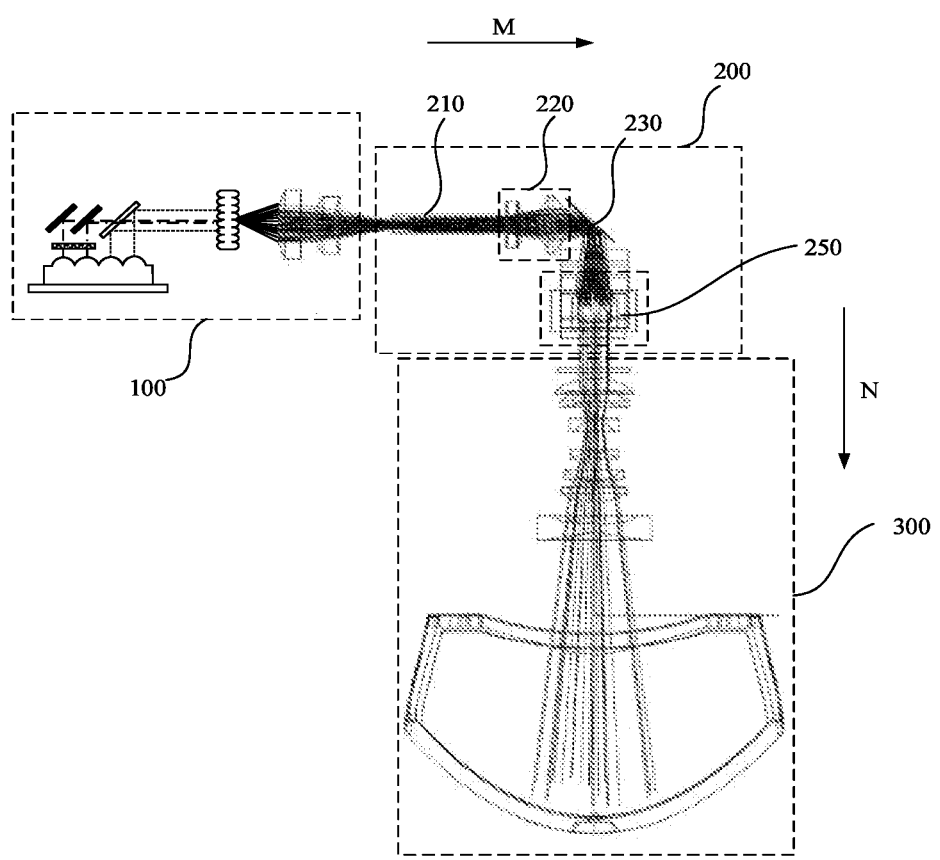
FIG. 2 is a diagram showing a beam path of a laser source assembly, an optical engine and a projection lens in a laser projection apparatus, in accordance with some embodiments.
Figure 3:
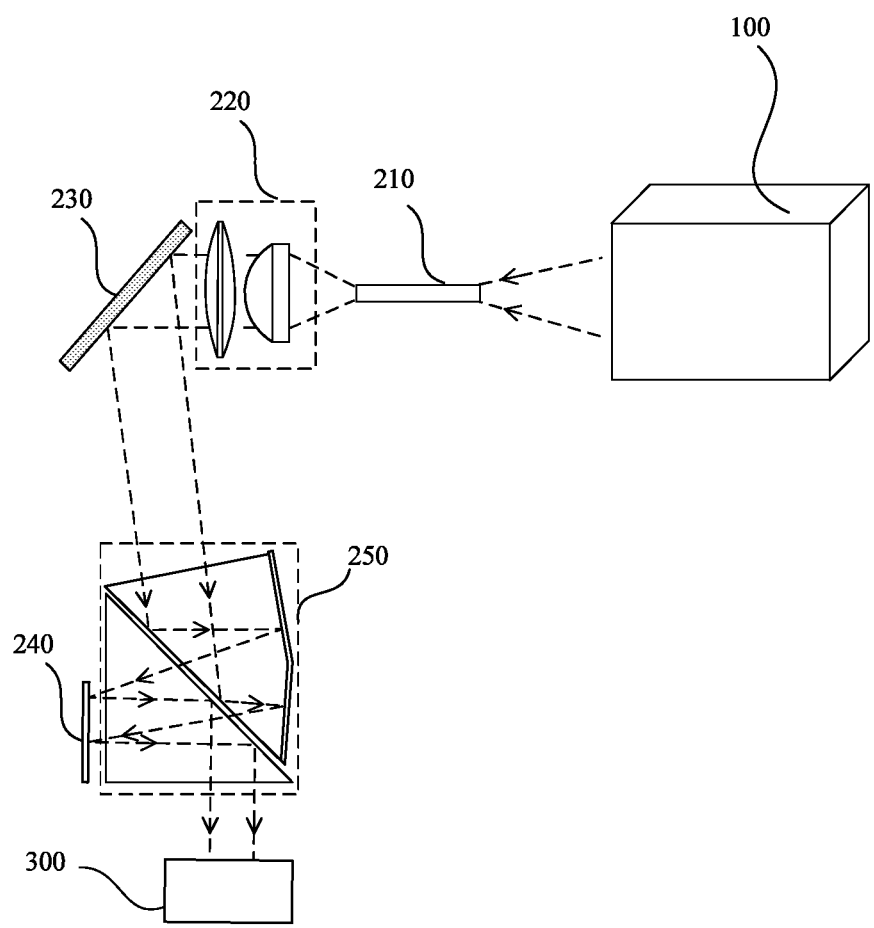
FIG. 3 is a diagram showing another beam path of a laser source assembly, an optical engine and a projection lens in a laser projection apparatus, in accordance with some embodiments.

The illumination beams emitted by the laser source assembly 100 enter the optical engine 200. Referring to FIGS. 2 and 3, the optical engine 200 includes a light pipe 210, a lens assembly 220, a reflector 230, a digital micromirror device (DMD) 240 and a prism assembly 250. The light pipe 210 may receive the illumination beams provided by the laser source assembly 100 and homogenize the illumination beams. The lens assembly 220 may first amplify the illumination beams, then converge the illumination beams, and finally emit the illumination beams to the reflector 230. The reflector 230 may reflect the illumination beams to the prism assembly 250. The prism assembly 250 reflects the illumination beams to the DMD 240. The DMD 240 modulates the illumination beams to obtain the projection beams, and then reflects the projection beams obtained after modulation into the projection lens 300. It can be understood that the light pipe 210 may further be disposed in the laser source assembly 100.

The reflector 230 is used for deflecting a path of the illumination beams emitted by the laser source assembly 100. For example, the reflector 230 is inclined at 45 degrees relative to a light exit direction of the laser source assembly 100. In this way, a beam path of the illumination beams emitted by the laser source assembly 100 is turned by 90 degrees, which may reduce a length of the beam path in the light exit direction of the laser source assembly 100, and further reduce a size of the laser projection apparatus 10.

In some embodiments, the prism assembly 250 is a total internal reflection (TIR) prism. The total internal reflection prism 250 is used for converting beams emitted by the light valve 240 into parallel beams, so as to improve smoothness of the image finally formed on the projection screen 400. The beam path of the illumination beams emitted by the laser source assembly 100 is deflected by the reflector 230, and the deflected beams enter the total internal reflection prism 250. The total internal reflection prism 250 guides the beams to the light valve 240, and the light valve 240 modulates the illumination beams to form the projection beams. The projection beams enter the total internal reflection prism 250 again, and then pass through the total internal reflection prism 250 to form parallel beams.

For example, as shown in FIG. 13A, the total internal reflection prism 250 may be a prism whose cross section is in the shape of a right triangle. Alternatively, as shown in FIG. 3, the total internal reflection prism 250 may also be formed by gluing a prism whose cross section is in the shape of a right triangle and a compensation prism, which is not limited in some embodiments of the present disclosure.

When used for illumination, the total internal reflection prism 250 realizes a total reflection function in an illumination beam path, and totally reflects beams incident on the prism to the light valve 240, thereby improving light exit efficiency of the laser projection apparatus 10. When the total internal reflection prism 250 is used in an ultra-short-focus lens system, the total internal reflection prism 250 may be used as a flat glass, which may well control an effect of dust on an imaging quality of the system.

In some embodiments, as shown in FIG. 13A, the optical engine 200 further includes a vibrating lens 260, and the vibrating lens 260 is located on a light exit path of the prism assembly 250. The vibrating lens 260 vibrates at a preset frequency, so that beams passing through the vibrating lens 260 are superimposed in a staggered manner and enter the projection lens 300.

The vibrating lens 260 includes an optical lens and a driving component. The driving component drives the optical lens to swing continuously with a preset rotation axis, and the optical lens may change a direction of beams accordingly. The optical lens may be a flat glass or a mirror.

Figure 13B:
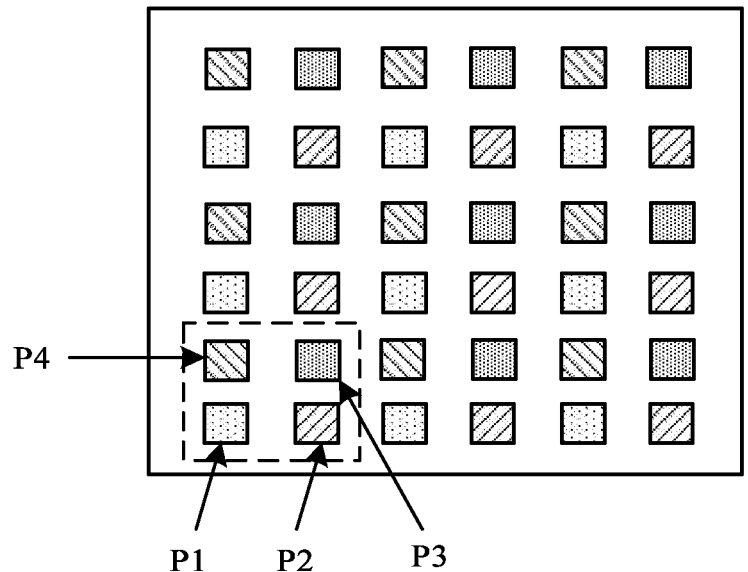
FIG. 13B is a schematic diagram showing an operation of a vibrating lens, in accordance with some embodiments.

For example, the optical lens of the vibrating lens 260 is driven by the driving component to periodically swing at four positions. For example, as shown in FIG. 13B, when the optical lens of the vibrating lens 260 periodically swings at four positions, the beams transmitted by the optical lens of the vibrating lens 260 swing in the order of position P1, position P2, position P3 and position P4. A high-resolution image is decomposed to obtain four sub-images. The first sub-image includes all pixels at position P1 in the high-resolution image, the second sub-image includes all pixels at position P2 in the image, the third sub-image includes all pixels at position P3 in the image, and the fourth sub-image includes all the pixels at position P4 in the image.

In a case where beams incident on the vibrating lens 260 are parallel beams (that is, each of the beams has the same incident angle), and the optical lens of the vibrating lens 260 is located at a position corresponding to the pixels at the position P1, the beams transmitted by the optical lens of the vibrating lens 260 form the first sub-image; then, after the optical lens of the vibrating lens 260 swings from the position corresponding to the pixels at the position P1 to the position corresponding to the pixels at the position P2, the beams transmitted by the optical lens of the vibrating lens 260 form the second sub-image; next, the third sub-image and the fourth sub-image are formed. Therefore, the four sub-images will be superimposed in a staggered manner. The human eye superimposes information of the four sub-images into a single image through the persistence of vision effect. In this way, details of an image perceived by the human eye are increased, and a resolution of a projection image is also improved.

On the basis of a resolution of the light valve 240, the resolution of the projection image may be improved by using the vibrating lens 260, so that design difficulty of the system may be reduced. The size of the entire apparatus may be taken into account while the resolution is improved.

It can be understood that the smaller the flatness and irregularity of the vibrating lens 260 and the reflector 230, the higher the imaging quality of the laser projection apparatus. Flatness refers to a deviation of a macro-concave-convex height of a substrate from an ideal plane. When a measured actual surface is compared with the ideal plane, a distance which is expressed as a line value between the two is a flatness error value; or it is possible to measure relative height differences of several points on the actual surface, and then convert the relative height differences into the flatness error value which is expressed as a line value.

In the optical engine 200, the DMD 240 plays a role of modulating the illumination beams provided by the laser source assembly 100 with image signals. That is, the DMD 240 controls the illumination beams to display different colors and different brightness for different pixels of an image to be displayed, so as to finally form an optical image. Therefore, the DMD 240 is also referred to as an optical modulator or a light valve. In addition, according to the number of optical modulators (or light valves) used in the optical engine 200, the optical engine 200 may be classified into a single-chip system, a double-chip system, or a three-chip system.

Figure 4:
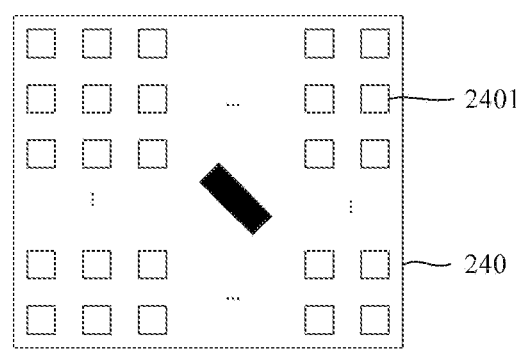
FIG. 4 is a diagram showing an arrangement of micromirrors in a digital micromirror device, in accordance with some embodiments.

As shown in FIG. 4, the DMD 240 includes thousands of micromirrors 2401 that can be individually driven to rotate. These micromirrors 2401 are arranged in an array, and each micromirror 2401 corresponds to a single pixel in the image to be displayed. In the digital light processing (DLP) projection architecture, each micromirror 2401 is equivalent to a digital switch, and can swing in a range of plus or minus 12 degrees (i.e., ±12°) or a range of plus or minus 17 degrees (i.e., ±17°) under an action of an external force. It can be understood that since each micromirror 2401 corresponds to a single pixel in the image to be displayed, the number of micromirrors determines the display resolution of the light valve 240.

Figure 5:
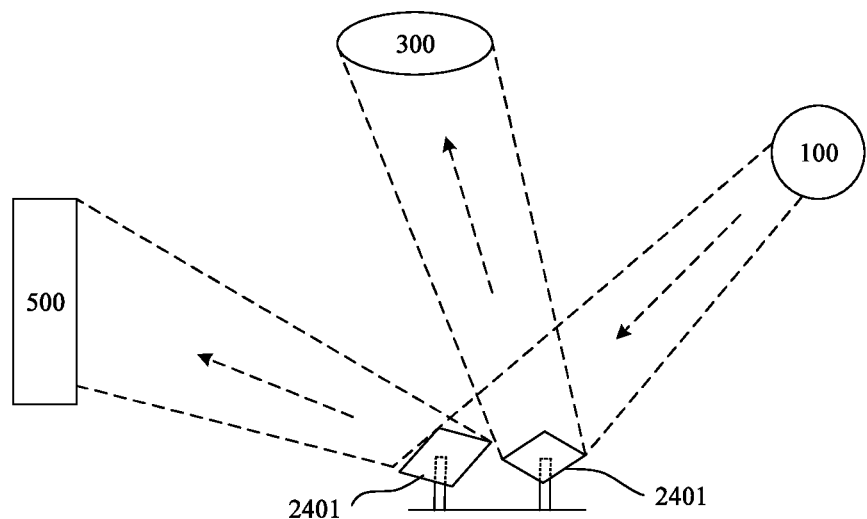
FIG. 5 is a schematic diagram showing an operation of micromirrors, in accordance with some embodiments.

As shown in FIG. 5, a beam reflected by the micromirror 2401 at a negative deflection angle is referred to as an OFF beam, and the OFF beam is an ineffective beam, which usually irradiates on the housing of the optical engine 200 or is absorbed by a laser absorption unit 500. A beam reflected by the micromirror 2401 at a positive deflection angle is referred to as an ON beam. The ON beam is an effective beam that enters the projection lens 300 to be used for projection imaging. After being irradiated by the illumination beams, the micromirror 2401 on a surface of the DMD 240 reflects the illumination beams to the projection lens 300. An ON state of the micromirror 2401 is a state that the micromirror 2401 is in and may be maintained when the illumination beams emitted by the laser source assembly 100 may enter the projection lens 300 after being reflected by the micromirror 2401. That is, the micromirror 2401 is in a state of the positive deflection angle. An OFF state of the micromirror 2401 is a state that the micromirror 2401 is in and may be maintained when the illumination beams emitted by the laser source assembly 100 do not enter the projection lens 300 after being reflected by the micromirror 2401. That is, the micromirror 2401 is in a state of the negative deflection angle.

In a display cycle of a frame of image, some or all of the micromirrors 2401 are switched once between the ON state and the OFF state, so as to realize the gray scales of the pixels in the frame of image through the durations of the ON state and the OFF state of the micromirrors 2401. For example, in a case where the pixels have 256 gray scales from 0 to 255, micromirrors corresponding to a gray scale 0 are in the OFF state in the entire display cycle of the frame of image, micromirrors corresponding to a gray scale 255 are in the ON state in the entire display cycle of the frame of image, and micromirrors corresponding to a gray scale 127 are in the ON state for half the time and in the OFF state for another half the time in the display cycle of the frame of image. Therefore, by controlling a state that each micromirror in the DMD 240 is in and a duration of each state in the display cycle of the frame of image through the image signals, luminance (the gray scale) of a pixel corresponding to the micromirror 2401 may be controlled, thereby achieving a purpose of modulating the illumination beams projected onto the DMD 240.

As shown in FIG. 2, the projection lens 300 includes a combination of a plurality of lenses, which are usually divided by group into a three-segment combination including a front group, a middle group and a rear group, or a two-segment combination including a front group and a rear group. The front group is a lens group proximate to a light exit side of the laser projection apparatus 10 (i.e., a side of the projection lens 300 away from the optical engine 200 in the N direction), and the rear group is a lens group proximate to a light exit side of the optical engine 200 (i.e., a side of the projection lens 300 proximate to the optical engine 200 in the N direction). The projection lens 300 may be a zoom projection lens, or a prime focus-adjustable projection lens, or a prime projection lens.

Figure 6:
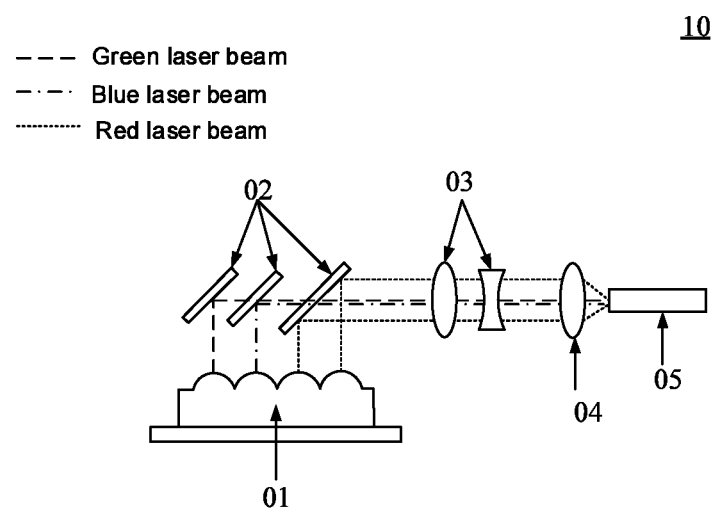
FIG. 6 is a structural diagram of a laser source assembly in the related art.

In the related art, as shown in FIG. 6, the laser source assembly 10 includes a laser 01, a laser combining lens group 02, a beam contraction lens group 03, a converging lens 04 and a light pipe 05. The laser 01 emits laser beams of three colors, such as a green laser beam, a blue laser beam and a red laser beam. The laser beams emitted by the laser 01 is directed to the laser combining lens group 02, and the laser combining lens group 02 combines the laser beams and guides them to the beam contraction lens group 03. The laser beams are incident on the converging lens 04 after being contracted by the beam contraction lens group 03, and then enter the light pipe 05 after being converged by the converging lens 04. After passing through the light pipe 05, the laser beams are guided to the light valve for modulation, and then projected through the projection lens to form a projection image. The light pipe 05 is used for homogenizing the laser beams, so as to improve the imaging quality of the projection image.

However, when the laser beams enter the light pipe 05, in order to homogenize the laser beams better, a length of the light pipe 05 needs to be great, which causes a size of the entire laser source assembly to be large, and in turn causes a size of the laser projection apparatus to be large. In addition, due to a dimensional tolerance of the light pipe 05, an area of a light spot homogenized by the light pipe 05 cannot completely match a size of the light valve, which increases loss of the laser beams and reduces the light exit efficiency of the laser projection apparatus.

Figure 7:
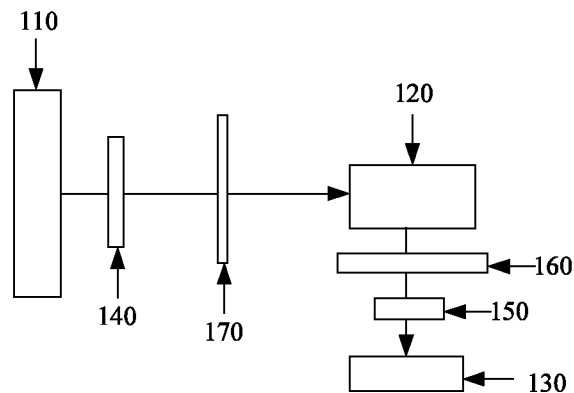
FIG. 7 is a structural diagram of a laser source assembly, in accordance with some embodiments.

In view of this, some embodiments of the present disclosure provide a laser source assembly. As shown in FIG. 7, the laser source assembly 100 includes a laser array 110, a light combining assembly 120 and a fly-eye lens 130. The laser array 110 is configured to emit laser beams of at least one color. The light combining assembly 120 is disposed on a light exit side of the laser array 110, and is configured to guide the laser beams emitted by the laser array 110 to the fly-eye lens 130. The fly-eye lens 130 is disposed on a light exit side of the light combining assembly 120, and an arrangement direction of the laser array 110 and the light combining assembly 120 is perpendicular to an arrangement direction of the light combining assembly 120 and the fly-eye lens 130. The fly-eye lens 130 is configured to homogenize the laser beams emitted by the laser array 110.

In the laser source assembly 100 provided by some embodiments of the present disclosure, the fly-eye lens 130 is used to homogenize the laser beams emitted by the laser array 110. Compared with using the light pipe to achieve homogenization of the laser beams in the related art, since a size of the fly-eye lens 130 in the beam path direction is small, a size of the laser source assembly 100 is also small.

After the laser source assembly 100 is integrated into the laser projection apparatus 10, the size of the laser projection apparatus 10 can be effectively reduced. In addition, since the fly-eye lens 130 has high manufacturing precision, the size of the fly-eye lens 130 can be precisely controlled, which is beneficial to controlling the area of the light spot. As a result, the area of the light spot matches the size of the light valve, the loss of the laser beams is reduced, and the light exit efficiency of the laser source assembly 100 and the laser projection apparatus 10 is improved.

Figure 8:
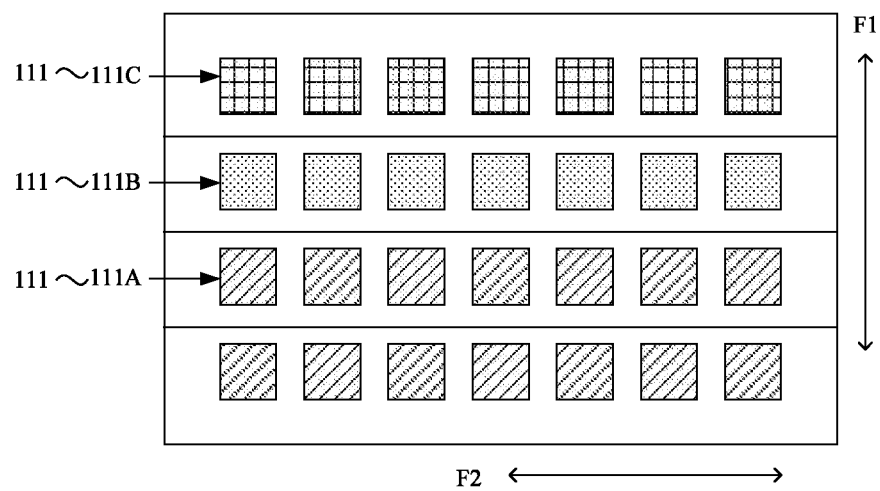
FIG. 8 is a structural diagram of a laser array of the laser source assembly shown in FIG. 7.

FIG. 8 is a structural diagram of a laser array in the laser source assembly shown in FIG. 7. In some embodiments, as shown in FIG. 8, the laser array 110 includes a plurality of lasers 111 arranged in an array, and the plurality of lasers 111 include a red laser 111A, a blue laser 111B and a green laser 111C. The red laser 111A is configured to emit a red laser beam. The blue laser 111B is configured to emit a blue laser beam and the green laser 111C is configured to emit a green laser beam.

For example, as shown in FIG. 8, the laser array 110 includes a plurality of lasers 111 arranged in four rows and seven columns. The plurality of lasers 111 include two rows of red lasers 111A, one row of blue lasers 111B, and one row of green lasers 111C.

For light with a slow propagation speed in a laser 111, its light vector direction is referred to as a slow axis of the laser 111. For light with a fast propagation speed in the laser 111, its light vector direction is referred to as a fast axis of the laser 111. As shown in FIG. 8, the fast axis direction of the laser 111 is F1 and the slow axis direction thereof is F2. The fast axis direction F1 of the laser 111 is parallel to a column direction of the laser array 110, and the slow axis direction F2 is parallel to a row direction of the laser array 110.

In addition, the red laser beam, the blue laser beam, and the green laser beam respectively emitted by the red laser 111A, the blue laser 111B, and the green laser 111C are referred to as beams of three primary colors. Various colors in nature may be obtained by changing frequencies and intensities of the beams of the three primary colors, and then combining them. In addition, a white beam may be formed by mixing the red laser beam, the blue laser beam and the green laser beam in same proportion.

Figure 10:
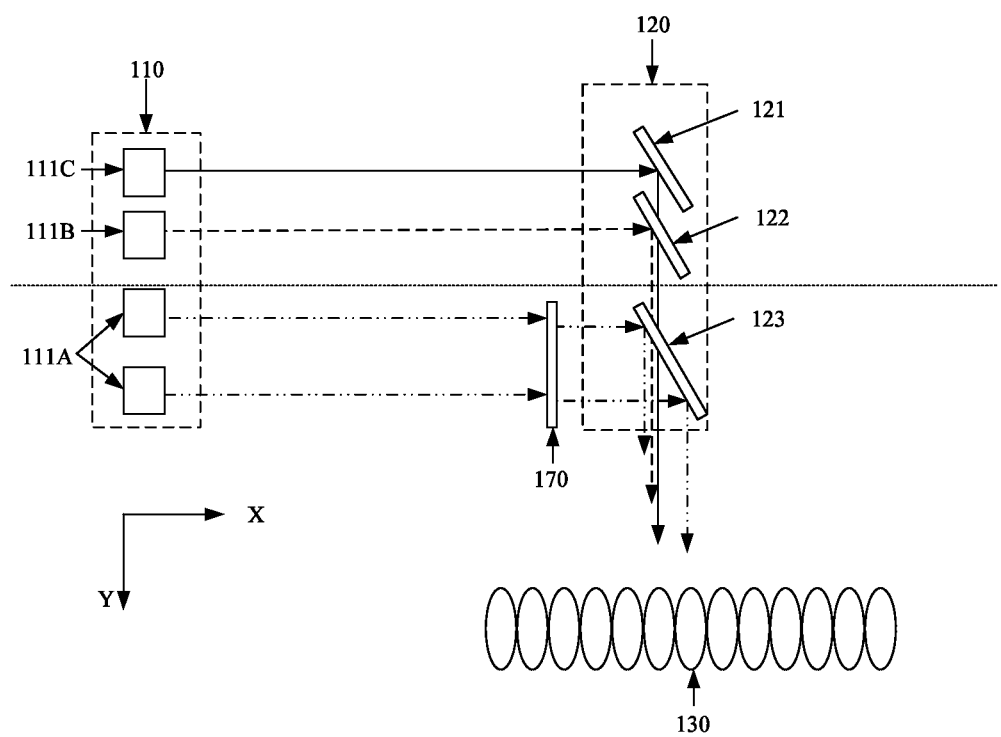
FIG. 10 is a diagram showing a beam path of a laser source assembly, in accordance with some embodiments.

In some embodiments, referring to FIG. 10, the light combining assembly 120 includes a first lens 121, a second lens 122 and a third lens 123 which are provided separately. The first lens 121, the second lens 122 and the third lens 123 are sequentially arranged in a Y-axis direction and are disposed obliquely. On a plane where a light incident surface of the fly-eye lens 130 is located, an orthogonal projection of the first lens 121, an orthogonal projection of the second lens 122 and an orthogonal projection of the third lens 123 at least partially overlap.

In some embodiments, as shown in FIG. 10, inclination angles of the first lens 121, the second lens 122 and the third lens 123 relative to a light exit surface of the laser array 110 are in the range of 30 degrees to 60 degrees. For example, the inclination angles of the first lens 121, the second lens 122 and the third lens 123 relative to the light exit surface of the laser array 110 are 30 degrees, 45 degrees, or 60 degrees. It can be understood that in a case where the inclination angles of the first lens 121, the second lens 122 and the third lens 123 relative to the light exit surface of the laser array 110 are not 45 degrees, in order to ensure that the laser beams emitted by the laser array 110 enter the fly-eye lens 130 in a direction perpendicular to the light incident surface of the fly-eye lens 130 after being combined by the light combining assembly 120, the light exit surface of the laser array 110 is not perpendicular to the light incident surface of the fly-eye lens 130.

The first lens 121 is located on a light exit path of the green laser 111C, the second lens 122 is located on a light exit path of the blue laser 111B, and the third lens 123 is located on a light exit path of the two rows of red lasers 111A. The first lens 121 is configured to reflect the green laser beam. The second lens 122 is configured to transmit the green laser beam and reflect the blue laser beam. The third lens 123 is configured to transmit the green laser beam and the blue laser beam, and to reflect the red laser beam.

In some embodiments, the first lens 121 may be a mirror for reflecting beams of all colors, or may be a dichroic lens for reflecting the green laser beam and transmitting laser beams of other colors; the second lens 122 may be a dichroic lens for reflecting the blue laser beam and transmitting laser beams of other colors; the third lens 123 may be a dichroic lens for reflecting the red laser beam and transmitting laser beams of other colors.

A dichroic lens, also known as a laser combining lens, is a color filter that may be used for selectively transmitting a beam of a certain color and reflecting beams of other colors. The dichroic lens has a high transmittance for transmitted light (up to 97%) and a high reflectance for reflected light (greater than 99%), and has characteristics of small absorption, less dispersion, less loss of laser beams, no film surface, etc.

In addition, as shown in FIG. 10, exit directions of the green laser beam, the blue laser beam and the red laser beam after passing through the light combining assembly 120 are the same, that is, they are all in the Y-axis direction. The exit direction Y is perpendicular to a light exit direction X of the laser 111. In this way, the light combining assembly 120 combines the red laser beam, the blue laser beam and the green laser beam emitted by the lasers 111 while deflecting propagation paths of the red laser beam, the blue laser beam and the green laser beam. As a result, a distance of the laser beam path in the light exit direction X of the laser 111 is shortened, components in the laser source assembly 100 are arranged compactly, and a space utilization rate is high. In this way, the size of the laser source assembly 100 and the weight of the system may be reduced, which meets requirements of miniaturization of the laser projection apparatus 10.

Figure 9:
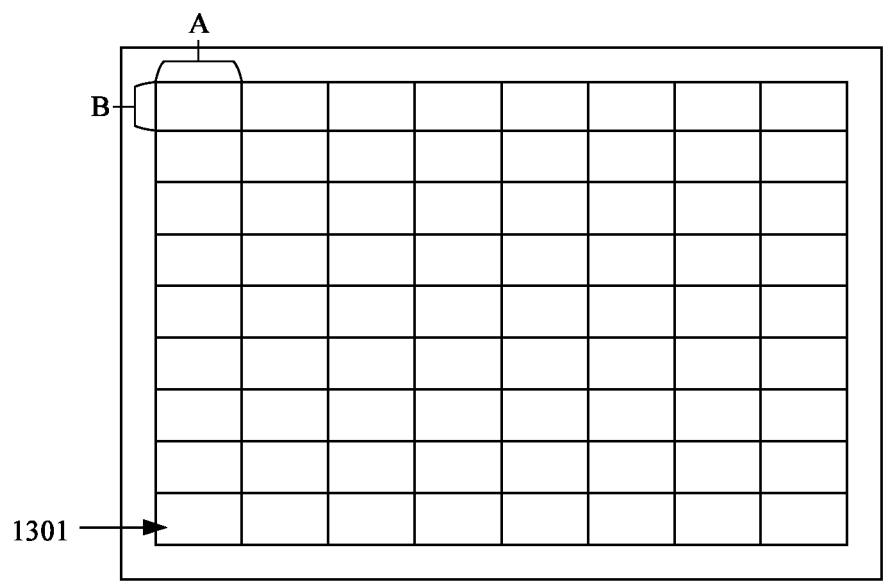
FIG. 9 is a front view of a fly-eye lens of the laser source assembly shown in FIG. 7.
Figure 12A:
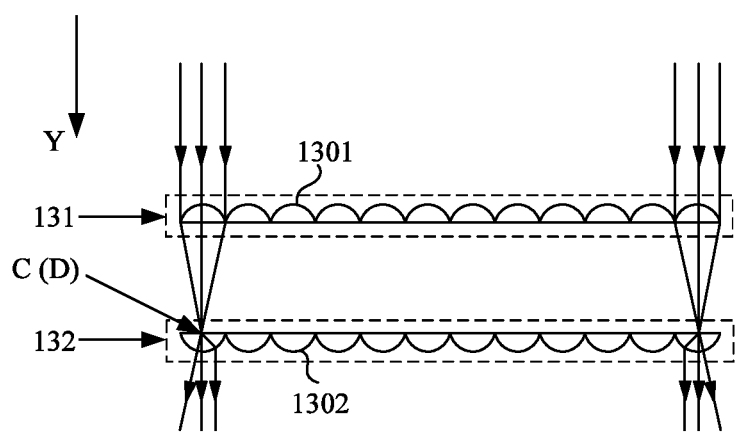
FIG. 12A is a structural diagram of a fly-eye lens in the laser source assembly shown in FIG. 7.
Figure 12B:
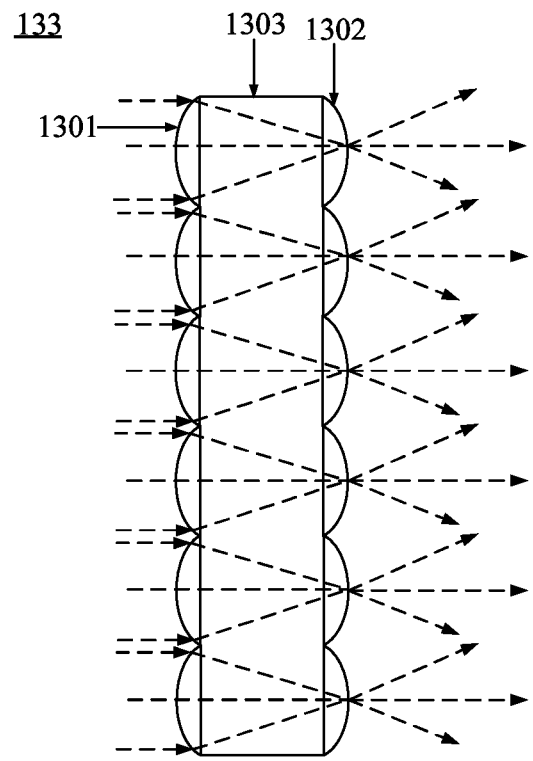
FIG. 12B is a structural diagram of another fly-eye lens in the laser source assembly shown in FIG. 7.

As shown in FIGS. 9, 12A and 12B, the fly-eye lens 130 includes a plurality of first microlenses 1301 and a plurality of second microlenses 1302. The plurality of first microlenses 1301 are arranged in an array and are located on the light incident surface of the fly-eye lens 130, and the plurality of second microlenses 1302 are arranged in an array and are located on the light exit surface of the fly-eye lens 130. The plurality of first microlenses 1301 correspond to the plurality of second microlenses 1302, and a shape and a size of each first microlens 1301 are the same as a shape and a size of a corresponding second microlens 1302. For example, the plurality of first microlenses 1301 and the plurality of second microlenses 1302 may be spherical convex lenses or aspherical convex lenses.

In some embodiments, a shape of a first microlens 1301 matches a shape of the light valve 240. For example, if the light valve 240 is in the shape of a rectangle, the first microlens 1301 is also in the shape of a rectangle. The light valve 240 is in the shape of a circle, and the first microlens 1301 is also in the shape of a circle.

A focal point D of the first microlens 1301 coincides with a center C of the corresponding second microlens 1302, and beams enter the first microlens 1301 in a direction parallel to an optical axis of the first microlens 1301 (i.e., the Y direction in FIG. 12A). After passing through the first microlens 1301, the beams are focused on the center C of the second microlens 1302, and light spots emitted by the second microlens 1302 are focused on a display screen by a subsequent focusing lens. The first microlens 1301 divides an entire wide beam of the laser array 110 into a plurality of narrow beams. Due to the superposition of narrow beams at symmetrical positions, slight inhomogeneity in the range of each narrow beam may be compensated, so that light energy may be effectively and uniformly utilized, and homogenization of beams may be achieved. The second microlens 1302 narrows the laser beams, thereby reducing the loss of the laser beams.

In some embodiments, as shown in FIG. 12A, the fly-eye lens 130 includes first fly-eye lens 131 and a second fly-eye lens 132. The first fly-eye lens 131 and the second fly-eye lens 132 are arranged in parallel in the Y-axis direction, and the first fly-eye lens 131 is closer to the light combining assembly 120 than the second fly-eye lens 132. The first fly-eye lens 131 is configured to receive beams emitted by the light combining assembly 120, and the second fly-eye lens 132 is configured to emit the homogenized beams. It can be understood that a light incident surface of the first fly-eye lens 131 is the light incident surface of the fly-eye lens 130, and a light exit surface of the second fly-eye lens 132 is the light exit surface of the fly-eye lens 130.

The first fly-eye lens 131 includes a plurality of first microlenses 1301, and the plurality of first microlenses 1301 are disposed on the light incident surface of the first fly-eye lens 131, and a light exit surface of the first fly-eye lens 131 may be a plane. The second fly-eye lens 132 includes a plurality of second microlenses 1302, and the plurality of second microlenses 1302 are disposed on the light exit surface of the second fly-eye lens 132, and a light incident surface of the second fly-eye lens 132 may be a plane.

By using two fly-eye lenses, a relative position between the two fly-eye lenses may be adjusted to eliminate a manufacturing error of each fly-eye lens in the manufacturing process, so that the light spot homogenized by the fly-eye lens 130 matches the light valve 240.

In some other embodiments, as shown in FIG. 12B, the fly-eye lens 130 includes a third fly-eye lens 133. The third fly-eye lens 133 includes a plurality of first microlenses 1301, a plurality of second microlenses 1302 and a substrate 1303. The plurality of first microlenses 1301 are disposed on a light incident surface of the substrate 1303, and the plurality of second microlenses 1302 are disposed on a light exit surface of the substrate 1303. In this way, it may not only be convenient for installation but also save a space occupied by the fly-eye lens 130. Therefore, the size of the laser source assembly 100 is further reduced, and the appearance thereof is more beautiful.

Figure 14:
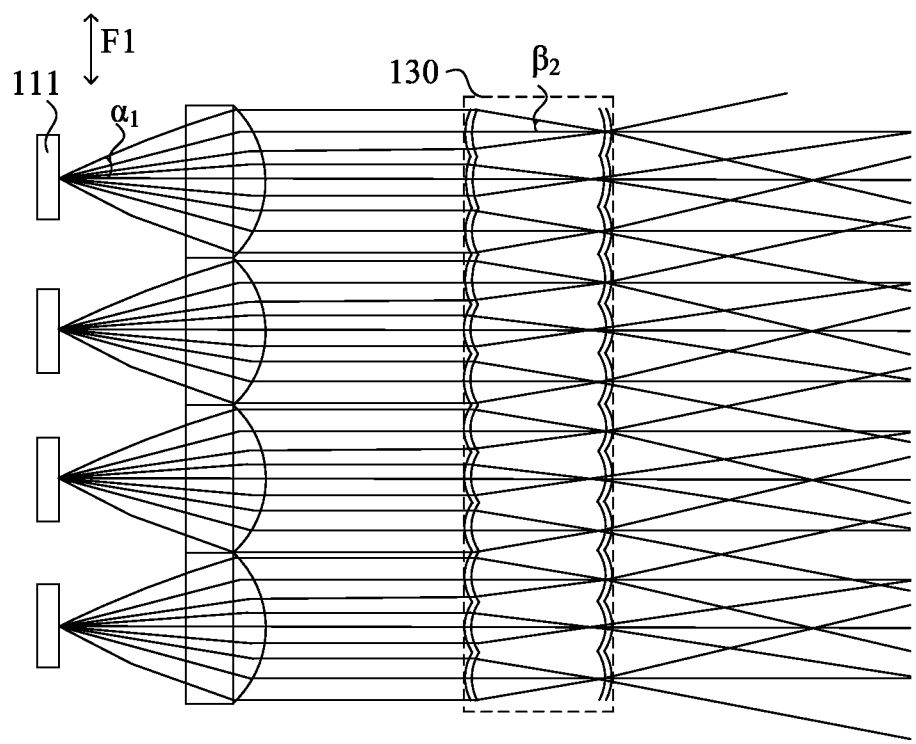
FIG. 14 is a side view of a laser array and a fly-eye lens, in accordance with some embodiments.
Figure 15:
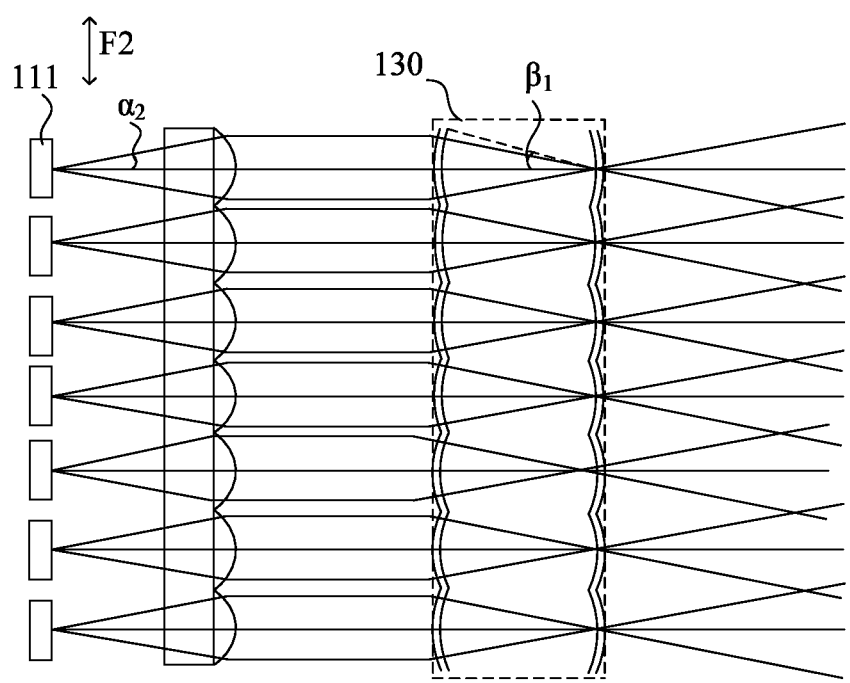
FIG. 15 is a top view of a laser array and a fly-eye lens, in accordance with some embodiments.

As shown in FIGS. 14 and 15, a sine value $\sin \alpha_1$ of a divergence angle $\alpha_1$ of the laser beam in the fast axis direction is greater than a sine value $\sin \beta_1$ of an aperture angle $\beta_1$ of the first microlens 1301 in the slow axis direction, that is, $\sin \alpha_1$ is greater than $\sin \beta_1$ ($\sin \alpha_1 > \sin \beta_1$). A sine value $\sin \alpha_2$ of a divergence angle $\alpha_2$ of the laser beam in the slow axis direction is greater than a sine value $\sin \beta_2$ of an aperture angle $\beta_2$ of the first microlens 1301 in the fast axis direction, that is, $\sin \alpha_1$ is greater than $\sin \beta_2$ ($\sin \alpha_2 > \sin \beta_2$). In this way, the size of the light spot of the laser beam emitted by the laser 111 matches the size of the first microlens 1301 in the fly-eye lens 130, which reduces the loss of the laser beam and improves the light exit efficiency of the laser source assembly 100 and the laser projection apparatus 10.

In addition, a divergence angle of the laser 111 is used for measuring a speed at which the beam diverges from the beam waist (the beam waist refers to a position where the beam radius is the smallest in a beam propagation direction, and a beam radius at this position is referred to as a beam waist radius). The divergence angle of the laser 111 may be measured by measuring the defocusing degree of the beam. That is, a beam analyzer is used to measure the beam radius at different positions to obtain the divergence angle of the laser 111.

In some embodiments, as shown in FIG. 9, the plurality of first microlenses 1301 located on the light incident surface of the fly-eye lens 130 divide a beam into N channels (a value of N is the number of the first microlenses 1301), a beam of each channel illuminates the an entire surface of an object (i.e., the light incident surface of the light valve 240) independently. That is, the illumination of the surface of the object is the superposition of the illumination of each channel. Therefore, the uniformity of a light spot on the illuminated surface of the object is improved.

In some embodiments, as shown in FIG. 9, the first microlenses 1301 of the fly-eye lens 130 are uniformly arranged, and a size of each first microlens 1301 in the slow axis direction is A, and a size of each first microlens 1301 in the fast axis direction is B. Therefore, an area $S_1$ of the first microlens 1301 is a product of A and B (i.e., $S_1 = A \times B$). It can be understood that sizes of the plurality of first microlenses 1301 may also be different, but a ratio of the size of each first microlens 1301 in the slow axis direction to the size thereof in the fast axis direction is the same, so that the size of each first microlens 1301 matches the size of the light valve 240.

The light spot formed by the laser beam emitted by the laser 111 on the light incident surface of the fly-eye lens 130 overlaps a region where at least one first microlens 1031 is located. In this case, the laser beam emitted by the laser 111 can be homogenized by the fly-eye lens 130. The larger the area of the light spot, the greater the number of first microlenses 1031 overlapping the light spot. The light spot is divided into multiple parts by the plurality of first microlenses 1301, which further improves the effect of the fly-eye lens 130 on homogenizing the laser beam emitted by the laser 111.

In some embodiments of the present disclosure, the area $S_2$ of the light spot of the laser 111 is greater than the area $S_1$ of the first microlens 1301. That is, $S_2$ is greater than $S_1$ ($S_2 > S_1$). In this way, the light spot formed by the laser beam emitted by each laser 111 on the light incident surface of the fly-eye lens 130 overlaps a region where at least two first microlenses 1301 are located, and the light spot of the laser 111 passes through a plurality of first microlenses 1301 of the fly-eye lens 130, so that the light spot is divided as many times as possible, to achieve requirements of uniformity of the laser beam.

In some embodiments, the area $S_2$ of the light spot of the laser 111 is greater than three times the area $S_1$ of the first microlens 1301, that is, $S_2$ is greater than three times $S_1$ ($S_2 > 3S_1$). In this way, the light spot formed by the laser beam emitted by each laser 111 on the light incident surface of the fly-eye lens 130 overlaps a region where at least four first microlenses 1301 are located, and the light spot of the laser 111 may pass through a plurality of first microlenses 1301, so that the light spot is divided into multiple parts by the plurality of first microlenses 1301 in the fly-eye lens 130, and then the divided light spot is superimposed by the subsequent focusing lens to achieve the homogenization of the beam.

In some embodiments, the sine value $\sin \alpha_1$ of the divergence angle $\alpha_1$ of the laser beam in the fast axis direction is greater than the sine value $\sin \alpha_2$ of the divergence angle $\alpha_2$ of the laser beam in the slow axis direction. The divergence angle $\alpha_1$ of the laser beam emitted by the laser 111 in the fast axis direction may be in the range of 20 degrees to 45 degrees, and the divergence angle $\alpha_2$ thereof in the slow axis direction may be in the range of 5 degrees to 10 degrees.

In some embodiments, the sine value $\sin \beta_1$ of the aperture angle $\beta_1$ of the first microlens 1301 in the slow axis direction is greater than the sine value $\sin \beta_2$ of the aperture angle $\beta_2$ of the first microlens 1301 in the fast axis direction.

In some embodiments, referring to FIG. 7, the laser source assembly 100 further includes a collimating lens 140, and the collimating lens 140 is located between the laser array 110 and the light combining assembly 120. The laser array 110 emits laser beams of three colors, and the laser beams of the three colors are incident on the collimating lens 140. The collimating lens 140 is configured to collimate the laser beams in the beam path, so as to form parallel exiting laser beams. Due to characteristics of laser beams, intensity distribution of the laser beams emitted by the laser array 110 may be uneven, resulting in the appearance of bright spots or stripes of various shapes. Parallel laser beams may be formed through a parallel exit effect of the collimating lens 140, and then the deflection of the beam path and the combination of laser beams of three colors are performed through the light combining component 120, so that the spatial coherence of the laser beams is reduced and the laser speckle is suppressed.

Since the laser source is a laser source of pure three colors, the laser beams will generate a speckle phenomenon (the speckle phenomenon refers to a phenomenon where a light spot on a surface of an object illuminated by the laser beams has the granular structure). Due to the high coherence of the laser beams, when the laser beams are reflected by a surface of an object (e.g., a projection screen), vibrations from various points on the object to an observation point (e.g., a position where the user is) are coherent, and the light field at the observation point is a superposition of coherent wavelets from points on the rough surface. Since the roughness of the rough surface is greater than the wavelength of the laser beam, the phases of the sub-laser beams emitted by each point on the object reaching the observation point are in a state of random distribution, the coherent superposition produces a speckle pattern, and the intensity of the speckle pattern is randomly distributed. In some embodiments of the present disclosure, the laser source assembly 100 further includes a diffusion assembly 150. The diffusion assembly 150 is located between the light combining assembly 120 and the fly-eye lens 130, and the diffusion assembly 150 may perform light homogenization processing on the laser beams of three colors, so as to reduce an uneven energy distribution of the laser spots. The diffusion assembly 150 includes a diffusion wheel or a diffusion sheet.

In some embodiments, the diffusion assembly 150 may be in a motion state. For example, the diffusion assembly 150 rotates along its axis with a certain frequency during operation, and the rotating diffusion assembly 150 may generate some random phases to laser beams in space, which may interfere with the coherence of the laser beams. As a result, the phenomenon of uneven distribution of the laser spots is reduced.

Figure 11:
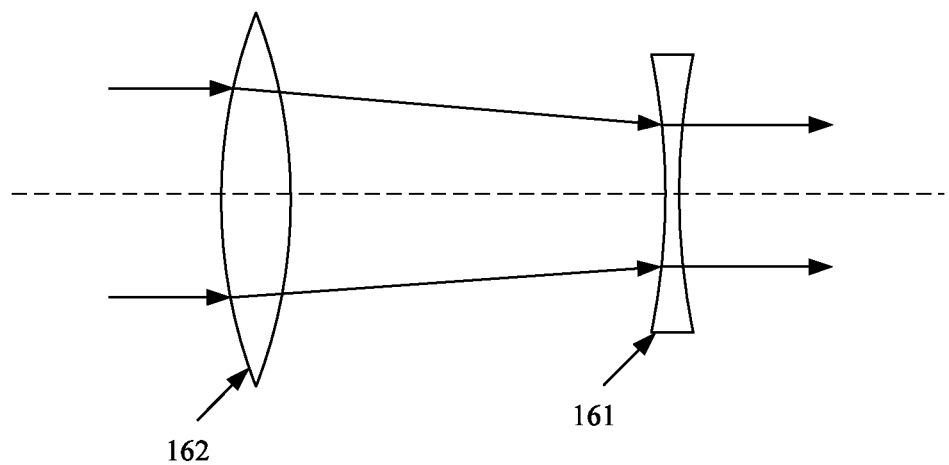
FIG. 11 is a structural diagram of a beam contraction lens group in the laser source assembly shown in FIG. 7.

In some embodiments, the laser source assembly 100 further includes a beam contraction lens group 160, and the beam contraction lens group 160 is located between the light combining assembly 120 and the diffusion assembly 150. If the size of the light spot of the laser beam emitted by the laser 111 is too large, the laser beam emitted by the laser 111 may be narrowed to improve the diffusion efficiency. As shown in FIG. 11, the beam contraction lens group 160 includes a concave lens 161 and a convex lens 162. An optical axis of the concave lens 161 coincides with an optical axis of the convex lens 162. The convex lens 162 is configured to receive incident beams whose incident direction is parallel to the optical axis of the convex lens 162, and converge the incident beams and transmit them to the concave lens 161. The concave lens 161 diverges the received beams and emits the beams in a direction parallel to the optical axis of the concave lens 161. In this way, the convex lens 162 converges beams with a large diameter and emits them to the concave lens 161, and the concave lens 161 diverges the beams to form exit beams with a small diameter, so as to achieve the beam contraction effect.

In some embodiments, the laser source assembly 100 may only include the diffusion assembly 150 or the beam contraction lens group 160.

In some embodiments, polarization polarities of the blue laser beam and the green laser beam emitted by the laser array 110 are opposite to that of the red laser beam, for example, the blue laser beam and the green laser beam are S-polarized light, and the red laser beam is P-polarized light, the laser source assembly 100 further includes a polarization conversion component 170. The polarization conversion component 170 is configured to make the polarization directions of the blue laser beam and the green laser beam the same as a polarization direction of the red laser beam. In this way, laser beams with a uniform polarization direction are used for forming a projection image, which can avoid a problem of color blocks in the formed projection image due to different transmittance and reflectivity of the optical lens for different polarized light.

In some embodiments, referring to FIG. 10, the polarization conversion component 170 is a half-wave plate. The half-wave plate 170 is located between two rows of red lasers 111A and the third lens 123, so as to convert the red laser beam from P-polarized light to S-polarized light. The half-wave plate 170 is perpendicular to the light exit direction X of the red laser 111A.

In some embodiments, the half-wave plate 170 is located between the laser array 110 and the light combining assembly 120, and is located on light exit paths of the blue laser 111B and the green laser 111C, so as to convert the blue laser beam and the green laser beam from S-polarized light to P-polarized light.

In some embodiments, the polarization conversion component 170 is a quarter-wave plate. The quarter-wave plate 170 is located between the laser array 110 and the light combining assembly 120, and is located on light exit paths of two rows of red lasers 111A, blue lasers 111B and green lasers 111C, so as to convert the red laser beam, the blue laser beam and the green laser beam into circularly polarized light.

The foregoing descriptions are merely specific implementations of the present disclosure, but the protection scope of the present disclosure not limited thereto. Any person skilled in the art could conceive of changes or replacements within the technical scope of the present disclosure, which shall be included in the protection scope of the present disclosure. Therefore, the protection scope of the present disclosure shall be subject to the protection scope of the claims.

What is claimed is:

1. A laser source assembly, comprising:
    a plurality of lasers configured to emit laser beams;
    a light combining assembly disposed on a light exit side of the plurality of lasers and configured to combine the laser beams; and
    a fly-eye lens disposed on a light exit side of the light combining assembly and configured to homogenize the laser beams; the fly-eye lens including:
        a plurality of first microlenses located on a light incident surface of the fly-eye lens, and
        a plurality of second microlenses located on a light exit surface of the fly-eye lens, the plurality of first microlenses corresponding to the plurality of second microlenses;
        wherein a sine value of a divergence angle of a laser beam in a fast axis direction is greater than a sine value of an aperture angle of a first microlens from the plurality of first microlenses in a slow axis direction, and a sine value of a divergence angle of the laser beam in the slow axis direction is greater than a sine value of an aperture angle of the first microlens in the fast axis direction.

2. The laser source assembly according to claim 1, wherein an area of a light spot formed by laser beams emitted by one of the plurality of lasers on the light incident surface of the fly-eye lens is larger than an area of one of the plurality of first microlenses.

3. The laser source assembly according to claim 2, wherein the area of the light spot formed by the laser beams emitted by the laser on the light incident surface of the fly-eye lens is greater than three times the area of the first microlens.

4. The laser source assembly according to claim 1, wherein the fly-eye lens includes a first fly-eye lens and a second fly-eye lens, and the first fly-eye lens is closer to the light combining assembly than the second fly-eye lens; and
    the plurality of first microlenses are arranged on a light incident surface of the first fly-eye lens, and the plurality of second microlenses are arranged on a light exit surface of the second fly-eye lens.

5. The laser source assembly according to claim 1, wherein the fly-eye lens includes a third fly-eye lens; and
    the third fly-eye lens includes the plurality of first microlenses, the plurality of second microlenses and a substrate, the plurality of first microlenses are disposed on a light incident surface of the substrate, and the plurality of second microlenses are disposed on a light exit surface of the substrate.

6. The laser source assembly according to claim 1, wherein the sine value of the divergence angle of the laser beam in the fast axis direction is greater than the sine value of the divergence angle of the laser beam in the slow axis direction.

7. The laser source assembly according to claim 1, wherein the sine value of the aperture angle of the first microlens in the slow axis direction is greater than the sine value of the aperture angle of the first microlens in the fast axis direction.

8. The laser source assembly according to claim 1, wherein the laser beams includes a green laser beam, a blue laser beam and a red laser beam; and
    the light combining assembly includes a first lens, a second lens and a third lens, the first lens is configured to reflect the green laser beam, the second lens is configured to transmit the green laser beam and reflect the blue laser beam, and the third lens is configured to transmit the green laser beam and the blue laser beam, and reflect the red laser beam.

9. The laser source assembly according to claim 8, wherein the first lens, the second lens and the third lens are all dichroic lenses.

10. The laser source assembly according to claim 8, wherein the first lens is a mirror, and the second lens and the third lens are dichroic lenses.

11. The laser source assembly according to claim 8, wherein the green laser beam and the blue laser beam are S-polarized light, and the red laser beam is P-polarized light; and the laser source assembly further comprises a polarization conversion component disposed between the plurality of lasers and the light combining assembly, and the polarization conversion component is configured to make polarization directions of the green laser beam, the blue laser beam and the red laser beam same.

12. The laser source assembly according to claim 11, wherein the polarization conversion component is a half-wave plate, and the half-wave plate is disposed in a beam path of the red laser beam, or beam paths of the blue laser beam and the green laser beam.

13. The laser source assembly according to claim 11, wherein the polarization conversion component is a quarter-wave plate, and the quarter-wave plate is disposed in beam paths of the red laser beam, the blue laser beam and the green laser beam.

14. The laser source assembly according to claim 1, further comprising a collimating lens located between the plurality of lasers and the light combining assembly.

15. The laser source assembly according to claim 14, further comprising a diffusion assembly located between the light combining assembly and the fly-eye lens, the diffusion assembly is a movable diffusion assembly.

16. The laser source assembly according to claim 15, further comprising a beam contraction lens group located between the light combining assembly and the diffusion assembly.

17. A laser projection apparatus, comprising:
the laser source assembly according to claim 1, the laser source assembly being configured to emit illumination beams;
an optical engine configured to modulate the illumination beams, so as to obtain projection beams; and
a projection lens configured to project the projection beams into an image.

* * * * *